United States Patent
Maass

(10) Patent No.: US 9,035,758 B2
(45) Date of Patent: May 19, 2015

(54) METHOD AND DEVICE FOR DRIVER INFORMATION

(75) Inventor: Alexander Maass, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 2447 days.

(21) Appl. No.: 11/660,724

(22) PCT Filed: Jul. 15, 2005

(86) PCT No.: PCT/EP2005/053418
§ 371 (c)(1),
(2), (4) Date: Sep. 10, 2007

(87) PCT Pub. No.: WO2006/018359
PCT Pub. Date: Feb. 23, 2006

(65) Prior Publication Data
US 2008/0061952 A1    Mar. 13, 2008

(30) Foreign Application Priority Data
Aug. 19, 2004 (DE) .......................... 10 2004 040 143

(51) Int. Cl.
*B60Q 1/00*      (2006.01)
*B62D 15/02*     (2006.01)
*B60Q 9/00*      (2006.01)
*B60W 50/16*     (2012.01)

(52) U.S. Cl.
CPC .............. *B62D 15/025* (2013.01); *B60Q 9/008* (2013.01); *B60W 50/16* (2013.01); *B62D 15/029* (2013.01)

(58) Field of Classification Search
USPC ......... 340/435, 919, 436, 438, 905, 907, 933; 701/3, 10, 72, 117, 36, 208, 300, 301; 382/100, 103, 199, 218, 286, 288; 348/148, 104, 119, 118
See application file for complete search history.

(56) References Cited

U.S. PATENT DOCUMENTS

| | | | | |
|---|---|---|---|---|
| 5,483,453 A | * | 1/1996 | Uemura et al. | 701/23 |
| 5,555,312 A | * | 9/1996 | Shima et al. | 382/104 |
| 5,642,093 A | * | 6/1997 | Kinoshita et al. | 340/439 |
| 5,890,083 A | * | 3/1999 | Franke et al. | 701/45 |
| 5,892,855 A | * | 4/1999 | Kakinami et al. | 382/291 |
| 5,904,725 A | * | 5/1999 | Iisaka et al. | 701/207 |
| 6,038,496 A | * | 3/2000 | Dobler et al. | 701/3 |
| 6,091,833 A | * | 7/2000 | Yasui et al. | 382/104 |
| 6,363,326 B1 | * | 3/2002 | Scully | 701/301 |
| 6,385,536 B2 | * | 5/2002 | Kimura | 701/209 |
| 6,449,383 B1 | * | 9/2002 | Oike et al. | 382/104 |
| 6,493,458 B2 | * | 12/2002 | Yasui et al. | 382/104 |
| 6,577,334 B1 | * | 6/2003 | Kawai et al. | 348/148 |
| 6,748,302 B2 | * | 6/2004 | Kawazoe | 701/1 |
| 6,813,370 B1 | * | 11/2004 | Arai | 382/104 |

(Continued)

FOREIGN PATENT DOCUMENTS

| | | |
|---|---|---|
| DE | 196 27 938 | 1/1998 |
| DE | 103 11 518 | 11/2003 |

(Continued)

*Primary Examiner* — Hoi Lau
(74) *Attorney, Agent, or Firm* — Kenyon & Kenyon LLP

(57) ABSTRACT

A method and a device for driver information, according to which a warning is produced on the basis of the lane information which indicates crossing of the lane edge. Upon branching of a roadway line, the particular outer lines are used as lane edge markings as the basis for the lane departure warning.

6 Claims, 5 Drawing Sheets

(56) References Cited

U.S. PATENT DOCUMENTS

| | | | |
|---|---|---|---|
| 6,819,779 B1* | 11/2004 | Nichani | 382/104 |
| 6,850,628 B2* | 2/2005 | Shirato | 382/104 |
| 7,043,342 B1* | 5/2006 | Dewees | 701/1 |
| 7,085,633 B2* | 8/2006 | Nishira et al. | 701/36 |
| 7,095,432 B2* | 8/2006 | Nakayama et al. | 348/148 |
| 7,190,281 B2* | 3/2007 | Nagasawa et al. | 340/903 |
| 7,265,657 B2* | 9/2007 | Nishida et al. | 340/436 |
| 7,403,219 B2* | 7/2008 | Miyashita et al. | 348/148 |
| 7,411,486 B2* | 8/2008 | Gern et al. | 340/438 |
| 2001/0056326 A1* | 12/2001 | Kimura | 701/208 |
| 2002/0031242 A1* | 3/2002 | Yasui et al. | 382/104 |
| 2003/0016287 A1* | 1/2003 | Nakayama et al. | 348/148 |
| 2003/0033080 A1* | 2/2003 | Monde et al. | 701/201 |
| 2004/0010371 A1* | 1/2004 | Matsumoto et al. | 701/300 |
| 2004/0042638 A1* | 3/2004 | Iwano | 382/104 |
| 2004/0107030 A1* | 6/2004 | Nishira et al. | 701/36 |
| 2004/0262063 A1 | 12/2004 | Kaufmann et al. | |
| 2005/0002558 A1* | 1/2005 | Franke et al. | 382/154 |
| 2005/0015203 A1* | 1/2005 | Nishira | 701/301 |
| 2005/0125121 A1* | 6/2005 | Isaji et al. | 701/36 |
| 2005/0200467 A1* | 9/2005 | Au et al. | 340/465 |
| 2005/0209748 A1* | 9/2005 | Watanabe et al. | 701/23 |
| 2005/0256636 A1* | 11/2005 | Miyashita et al. | 701/207 |
| 2005/0265579 A1* | 12/2005 | Nishida | 382/103 |
| 2005/0270374 A1* | 12/2005 | Nishida et al. | 348/148 |
| 2005/0273260 A1* | 12/2005 | Nishida et al. | 701/301 |
| 2007/0198188 A1* | 8/2007 | Leineweber et al. | 701/300 |

FOREIGN PATENT DOCUMENTS

| | | |
|---|---|---|
| DE | 102 38 215 | 12/2003 |
| EP | 0 736 414 | 10/1996 |
| EP | 1 074 430 | 2/2001 |
| EP | 1 531 112 | 5/2005 |

* cited by examiner

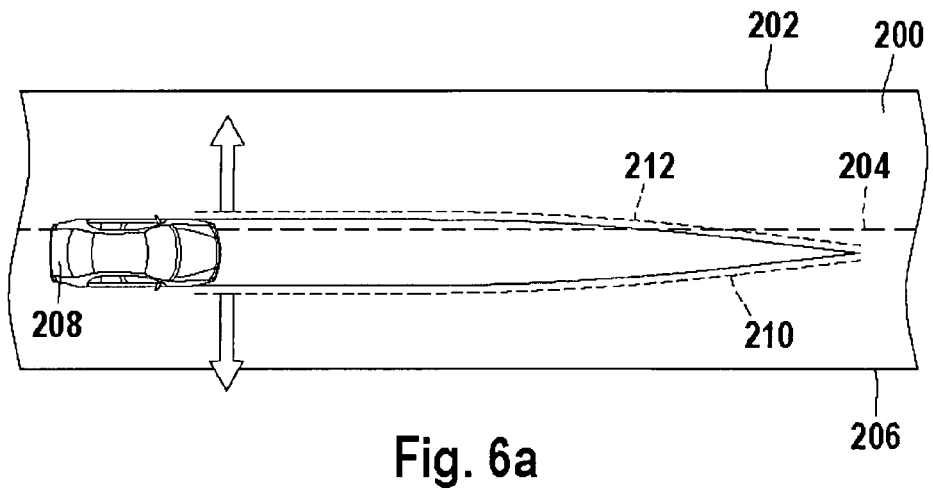
Fig. 6a
Fig. 6b
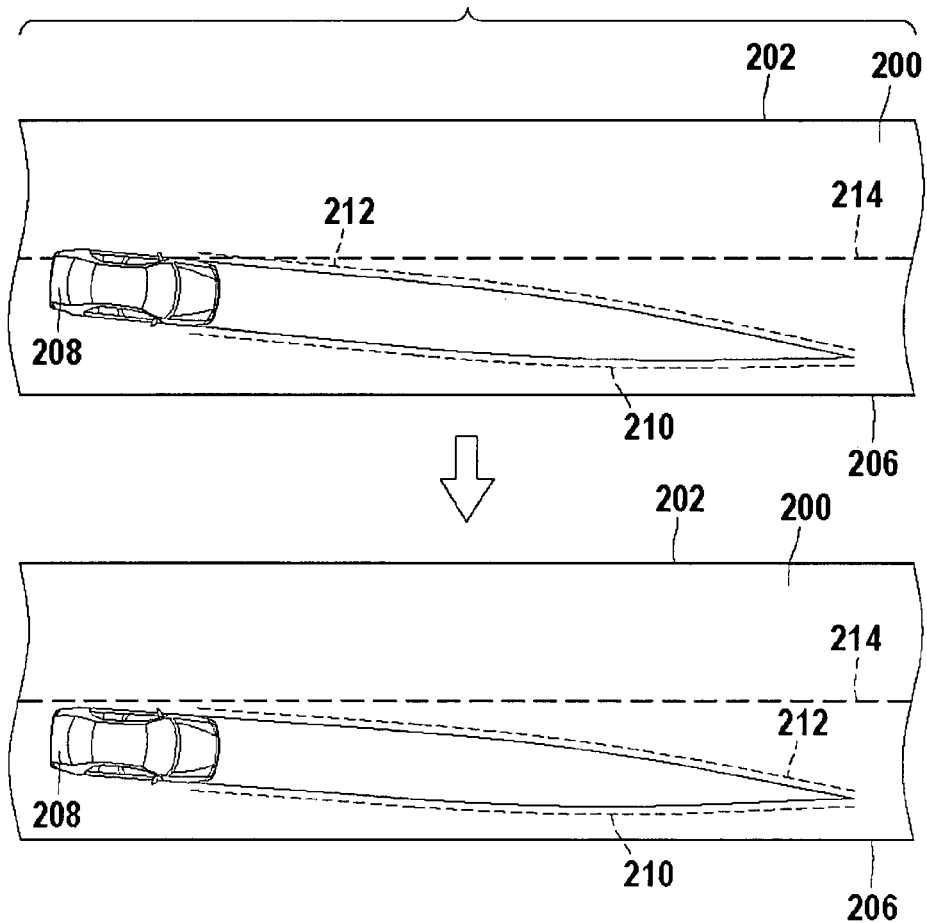

METHOD AND DEVICE FOR DRIVER INFORMATION

FIELD OF THE INVENTION

The present invention relates to a method and a device for driver information, in particular on the basis of lane information.

BACKGROUND INFORMATION

Driver assistance systems which operate on the basis of lane information are known in the related art. An example of such a driver assistance system is a warning system which warns the driver upon departure from the lane and/or imminent departure from the lane. A system of this type is described, for example, in European Patent Application No. EP 1074430, in which the roadway (lane) on which the vehicle is moving is ascertained using image sensor systems and the driver is warned when the vehicle departs or threatens to depart from this lane. Furthermore, German Patent Application Nos. DE 103 11 518 and DE 102 38 215 describe driver assistance systems of this type. In these cases, image sensor systems which are installed in the vehicle and record the scene in front of the vehicle are used to detect the lane. The parameters of the lane and thus the lane itself are ascertained from the recorded images of the lane edge markings. Ascertaining the lane is essentially a function of the quality of the lane edge markings.

An example of recognizing and modeling lane edge markings from video images is known from German Patent Application No. DE 196 27 938, roadway width, roadway curvature, curvature change, and lateral offset of the vehicle, inter alia, being ascertained as parameters.

SUMMARY OF THE INVENTION

The measure in a lane departure warning of selecting suitable lines from multiple recognized lines which may correspond to roadway edge markings effectively avoids unnecessary warnings and/or incorrect warnings, which may not be comprehensible for the driver in the particular operating situation. It is especially advantageous to select the lines furthest from the vehicle position on the left and right as edge markings for the lane departure warning system.

Special advantages are thus achieved with branching roadway edge markings, such as exits, construction site markings, etc., unnecessary warnings being avoided in particular in such situations.

It is especially advantageous to re-select the roadway edge markings to be taken into consideration for the lane departure warning after a specific time or distance on the basis of the actual course of the vehicle. The warning readiness of the lane departure warning system is thus reproduced even in the event of multiple roadway edge markings on the road.

Overall, warning behavior which is acceptable for the driver is advantageously produced.

It is especially advantageous that incorrect warnings may also be avoided if there are no further indications, such as a set turn signal, for selecting lines, which may be roadway edge markings, for the lane departure warning system.

BRIEF DESCRIPTION OF THE DRAWINGS

FIGS. 6a-6c show a procedure for the line selection as a function of the course of the vehicle.

DETAILED DESCRIPTION

Figure 1:
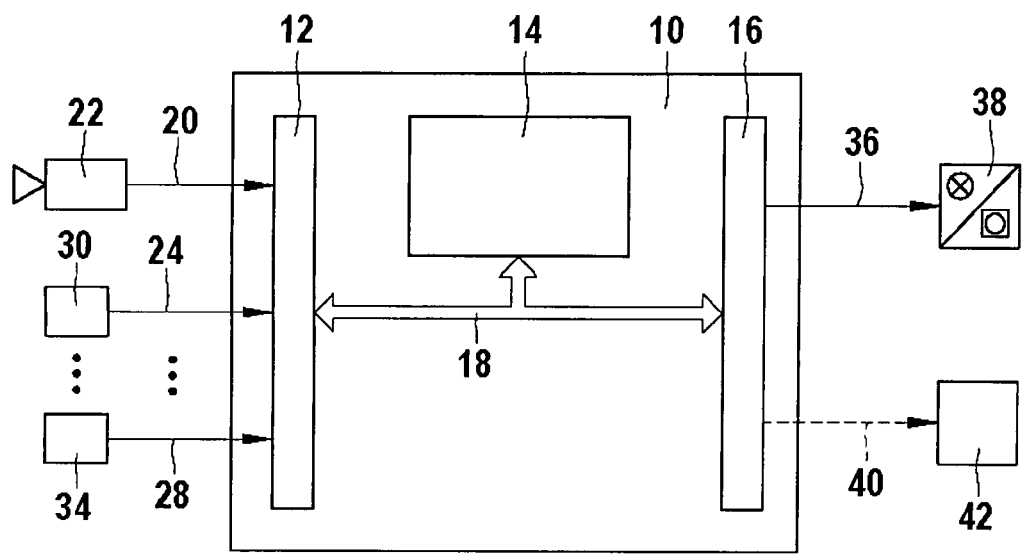
FIG. 1 shows a block diagram of a driver assistance system, which is implemented in particular for driver warning or reaction in the event of imminent departure from the lane by the vehicle.

FIG. 1 shows a device which is used for warning the driver or for reacting upon departure from the lane by the vehicle. A control and/or analysis unit 10, which has an input circuit 12, a microcomputer 14, and an output circuit 16, is shown. These elements are connected to a bus system for mutual data exchange. Input lines from various measuring units, via which measured signals and/or measured information are transmitted, are supplied to input circuit 12. A first input line 20 connects input circuit 12 to an image sensor system 22, which is situated in the vehicle and which records the scene in front of the vehicle. Corresponding image data are transmitted via input line 20. Furthermore, input lines 24 through 28 are provided, which connect input circuit 12 to measuring units 30 through 34. These measuring units are, for example, measuring units for measuring the vehicle velocity, for detecting the steering angle, and for detecting further operating variables of the vehicle which are significant in connection with the function of the driver assistance system. At least one warning unit 38 is activated via output circuit 16 and output line 36, such as a warning lamp and/or a loudspeaker for an acoustic warning and/or for a voice output and/or a display for displaying an image, with the aid of which the driver is informed or warned of the imminent departure from the lane. A haptic warning (e.g., steering wheel vibration) may also be provided. In addition or alternatively thereto, in another exemplary embodiment, an actuator system 42 is activated via output circuit 16 and an output line 40, which automatically returns the vehicle back into the lane by intervening in the steering of the vehicle, for example, and thus prevents the departure from the lane.

In one embodiment, lane data are ascertained in accordance with the above-mentioned related art, roadway model parameters being ascertained by analyzing the detected image according to an imaging procedure including the camera data and being adapted to the measured image. Thus, the driver assistance system analyzes the image acquired by the image sensor and ascertains lines in the image, in particular those which are the lane edge markings (e.g., center lines, etc.). The curves of the ascertained lane edge markings (left and right) are then approximated mathematically by functions, e.g., as clothoid models, for example, approximated by a second-order polynomial. Parameters of these equations are, for example, curvature and curvature change, and the distance of the vehicle itself to the edge markings on the left and on the right. Furthermore, the angle between the tangents of the calculated lane and the movement direction of the vehicle itself may be ascertained. The lane information ascertained in this way is then supplied to the assistance system, which recognizes imminent crossing of the lane on the basis of the intrinsic trajectory (trajectories) of the vehicle (ascertained on the basis of the yaw rate, for example) and warns the driver and/or initiates countermeasures at the suitable instant.

This procedure functions reliably as long as only two lines are recognizable on the roadway, both of which represent the two roadway edge markings (left and right roadway edges). However, there are also driving situations in which multiple lines are to be ascertained from the camera image (roadway edge markings and lines which may be interpreted as such), for example, in the event of newly starting lanes, upon the transition from a two-lane road to a four-lane road (or at exits), for example, at former markings, at asphalt seams which may be interpreted as a lane marking, or at construction sites, at which further lane markings have been applied over the existing lane markings. The existing system would warn the driver when he enters the newly beginning lane without his turn signal on, for example. The system would also warn if any type of line (such as an asphalt seam, contrast at roadway coverings of different brightnesses, old invalid construction site marking, or similar) was incorrectly interpreted as a lane marking. A reliable selection of the valid lane marking is also not always possible at current construction site markings, so that driver warnings or reactions which may not be comprehensible could also possibly be produced here. Therefore, in all of the cited cases, the warning that may be produced may not be comprehensible for the driver, in particular also in the cases in which the driver is warned although he is keeping to the lane, for example, because he is driving over an asphalt seam.

Figure 2:
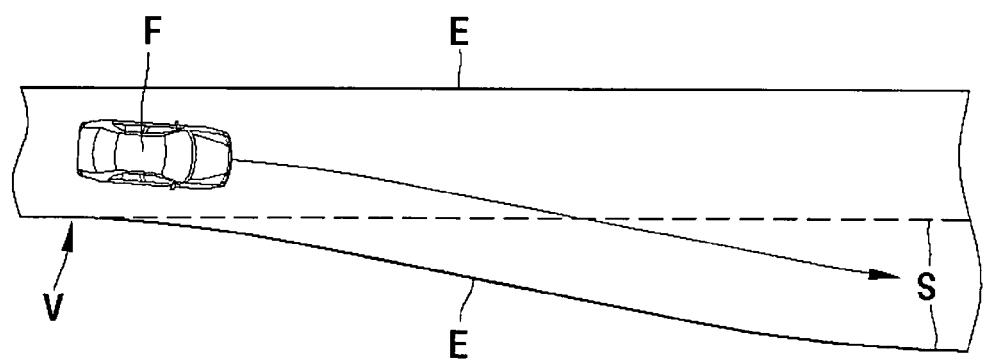
FIGS. 2 through 4 show driving situations in which the procedure described is applied.
Figure 3:
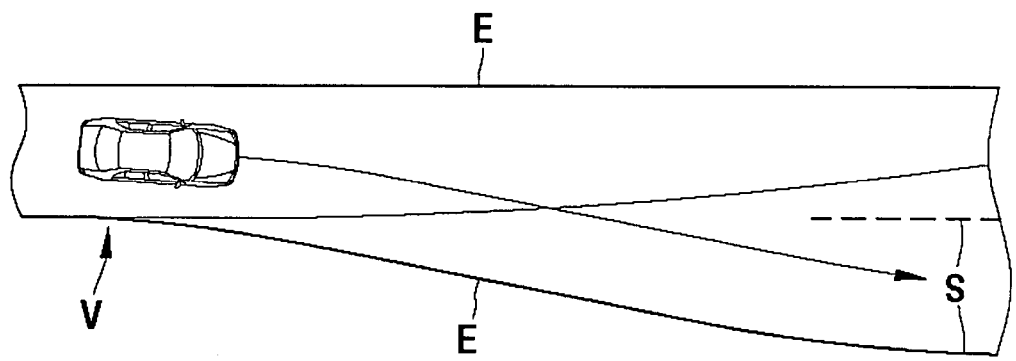
Figure 4:
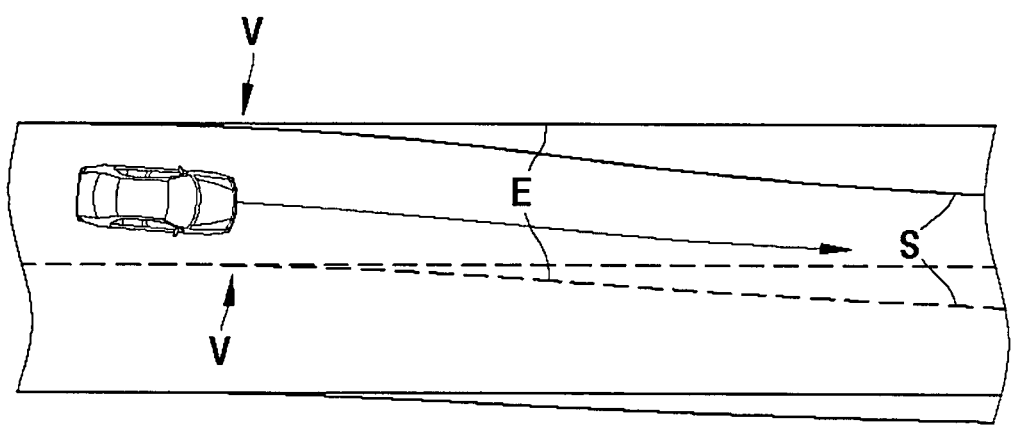

FIGS. 2 through 4 show traffic situations in which the above-mentioned problems may occur. FIG. 2 shows a traffic situation in which a new lane begins. If vehicle F drives over dashed roadway marking V through S, as indicated by the arrow in FIG. 2, a driver warning would occur if line V-S is used to ascertain the warning instant. In order to avoid such a warning, which the driver may not comprehend, and cause warning behavior which is acceptable for the driver, in the event of branching from roadway edge marking lines (point V), the particular line further from the vehicle (the two lines identified by "E") is first used for ascertaining the warning. Later, after a specific driving distance (such as 50 meters) or a specific driving time, for example, it is decided on the basis of the course actually covered by the vehicle (derived from the steering angle, for example), whether a line more proximal to the vehicle is to be used for the following warnings. In the example shown in FIG. 2, this means that from a specific position and/or a specific instant, the two lines identified by "S" are to be used as the basis of the lane departure warning system. A warning does not arise in these cases from driving over dashed line V-S, since the lines marked with E are used as the basis of the lane departure warning for a specific distance or time.

This is correspondingly true for the traffic situation shown in FIG. 3. There are also branched lines here, in the present case, at point V, actual edge marking E and an asphalt seam (black line), which is driven over by the vehicle. In the event branching lines (point V) are recognized, line E, which is further away from the vehicle, is also used as the basis of the lane departure warning here. After a specific driving distance or driving time, lines closer to the vehicle are then used as the basis for the future course of the vehicle (lines S).

FIG. 4 shows the traffic situation for a "construction site." Branches V of the roadway edge markings result here. In accordance with the procedure described above, first the known branching of lines E, which are further from the vehicle, is used as the basis of the lane departure warning. After a specific driving distance or driving time, lines S, which are closer to the vehicle, are determined as the basis for the lane departure warning system on the basis of the course of the vehicle that then exists.

Figure 5:
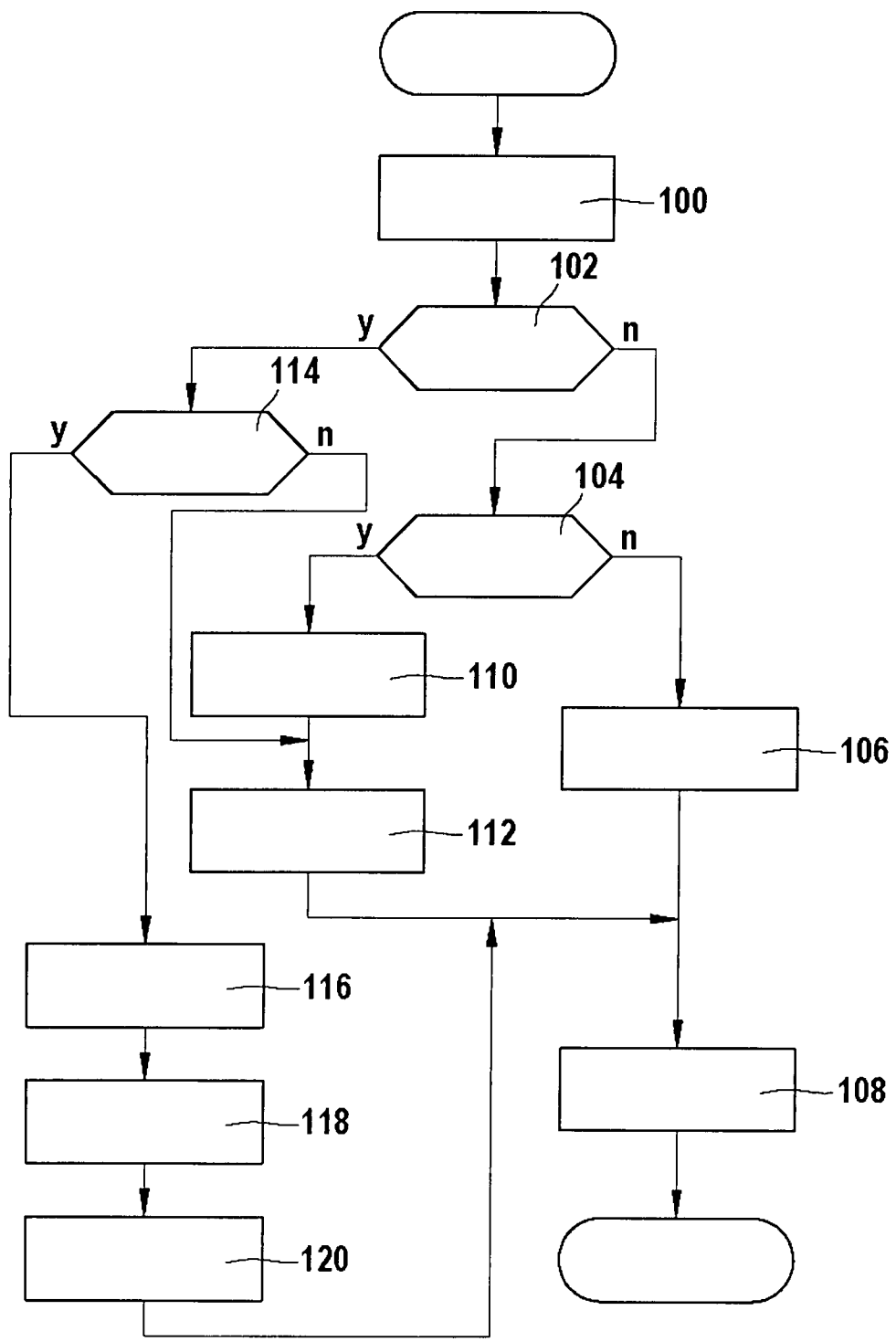
FIG. 5 shows a flow chart which indicates a preferred implementation of the procedure as a computer program.

The procedure described is implemented in the scope of a program of computer unit 14. The flow chart shown in FIG. 5 sketches a program of this type. The program indicated is executed cyclically after the activation of the lane departure warning function.

In first step 100, the data on the roadway lines recognized as possible roadway edge markings are input. In the preferred exemplary embodiment, these data are obtained and transmitted, for example, in the form of equation parameters of higher-order polynomials by analyzing at least one camera image of the scene in front of the vehicle. A corresponding procedure is described in the above-mentioned related art.

In following step 102, a settable mark is checked for a specific value, such as 1. If the mark is not set to value 1, i.e., if no line branches or multiple lines have been recognized in one of the last passes, it is then checked in following step 104 on the basis of the input lane data whether there are more than two data records which were identified as lane edge markings, in particular, whether there are intersections between two lane data records. In other words, it is checked whether more than two lines were recognized and/or whether a line has branched into at least two lines. Since the lane data in the preferred exemplary embodiment exist as polynomial data records, the checking is performed on the basis of the number of data records, possibly taking the position of the lines in relation to the vehicle into consideration (e.g., on left or right), and/or on the basis of calculated intersections of the polynomial curves derived from the data records. If data records for only two lines (one to the left, the other to the right of the vehicle) exist, these two data records are assigned as the edge markings in step 106 and used as the basis of the lane departure warning system. In step 108, the known functionality of the lane departure warning system is calculated on the basis of these edge markings and a warning is output if necessary, if a departure from the lane is imminent.

If step 104 has shown that there are branches in the lines or more than two data records exist, the mark is set to value 1 (step 110). In one embodiment, upon renewed setting of the mark after a reset (see following step 120), the passage of a specific time or driving distance is awaited in order to avoid continuous switching back and forth. In following step 112, the two lines furthest from the vehicle (one to the left, the other to the right), i.e., the outermost lines and/or the associated data records of the two edge markings, are assigned to the lane departure warning system. Step 112 is followed by step 108, in which the lane departure warning system estimates departure from the lane on the basis of the data records assigned as edge markings in step 112 and produces a warning if necessary.

If step 102 has shown that the mark is set to value 1, i.e., branching of lines and/or more than two line data records which come into consideration as edge markings exist, it is checked in step 114 whether the vehicle has covered a predefined distance, such as 50 meters, since the mark was set. This is performed on the basis of wheel speed signals or other distance sensors. The measured path is compared to a maximum value. If the maximum value has not yet been reached, the sequence continues with step 112 and the lane departure warning system is operated with the outermost data records coming into consideration as edge markings. However, if the maximum distance has been reached, the actual course covered by the vehicle is determined in step 116. In the preferred exemplary embodiment, this is performed on the basis of the position of the vehicle within the different edge marking lines.

Instead of the above-mentioned distance, in another exemplary embodiment, a driving time value since the mark was set is additionally or alternatively checked in step 114 and if a maximum driving time has been exceeded, the sequence continues with step 116 instead of with step 112.

After determining the course of the vehicle, the data records which correspond to the course of the vehicle are selected as edge markings to be taken into consideration (step 118).

In the following step, the mark is set to the value zero (step 120) and the lane departure warning system is then operated in step 108 on the basis of the current edge marking selection.

Figure 6C:
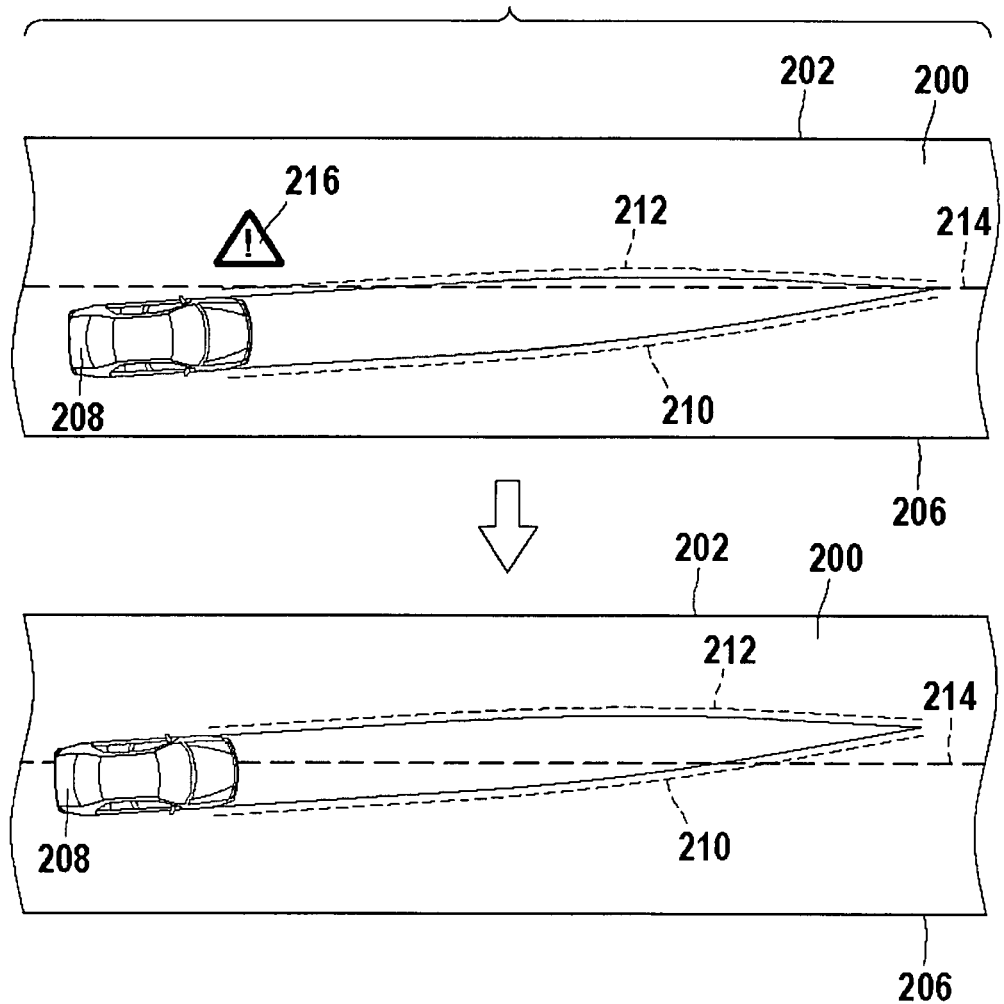

FIGS. 6a-6c sketch the procedure for selecting the relevant lines as a function of the course of the vehicle. FIG. 6a shows a roadway 200 having three roadway lines 202, 204, 206. Furthermore, a vehicle 208 is shown, as well as the warning trajectories 210, 212 on the left and right calculated by the lane departure warning as described according to German Patent Application No. DE 103 11 518. The warning trajectories represent the possible course of the vehicle taking possible steering corrections of the driver into consideration. If a trajectory intersects the assigned relevant line (right trajectory right line, left trajectory left line), a warning is given. As shown in FIG. 6a, lines 210, 212 further from the vehicle are the relevant lines initially.

In FIG. 6b, the vehicle gets into a lane. As soon as a line (214) is located outside the warning trajectory but closer to the vehicle than previous relevant line 202, line 214 is predefined as the relevant line. In another embodiment, it is checked after expiration of a time or driving distance whether this line constellation exists and if so, a changeover is performed.

This line is maintained until a warning 216 occurs (FIG. 6c). After the warning, relevant line 214 is left and the next closest line (here 202) on the same vehicle side which lies outside the warning trajectory is predefined as the relevant line.

The implementation is performed through mathematical treatment of curve equations.

In summary, in a method for driver information, in which a warning for the driver is produced when the vehicle threatens to depart from the lane and/or departs from the lane, and the warning is ascertained on the basis of roadway edge lines, in the event of a recognized line branching into multiple lines, at least one outermost line is selected to ascertain the warning. If line branches into multiple lines which may be roadway edge lines exist on both vehicle sides, the outermost line is used on each of the two sides.

What is claimed is:

1. A method for providing driver information, comprising:
providing a warning for a driver of a vehicle when the vehicle at least one of (a) threatens to depart from a lane and (b) departs from a lane, the warning being ascertained on the basis of a pair of roadway edge lines defining a lane, wherein in the event of recognizing branching of at least one of the roadway edge lines into multiple branch lines, a branch line further away from the vehicle is selected to ascertain the warning.

2. The method according to claim 1, wherein the branch line further away from the vehicle is used as a basis of the warning for at least one of a predefined driving distance and a predefined driving time.

3. The method according to claim 1, wherein a warning is output if the vehicle at least threatens to cross a selected line.

4. The method according to claim 1, wherein the warning is at least one of (a) optical, (b) acoustic, (c) haptic, and (d) representative of a steering intervention counteracting a crossing of the roadway edge line.

5. The method according to claim 1, wherein a line further from the vehicle is defined as the roadway edge line after said warning.

6. A device for providing information to a driver of a vehicle, comprising:
means for providing a lane departure warning for a driver of a vehicle when the vehicle at least one of (a) threatens to depart from a lane and (b) departs from a lane; and
means for detecting at least a pair of roadway lines as roadway edge lines defining a lane, wherein in the event of recognizing branching of at least one of the roadway edge lines into multiple branch lines, a branch line further away from the vehicle is selected to ascertain the lane departure warning.

\* \* \* \* \*